June 5, 1951  O. W. PIES  2,555,604
AUTOMATIC REEL CONTROL MECHANISM
Filed Jan. 9, 1946
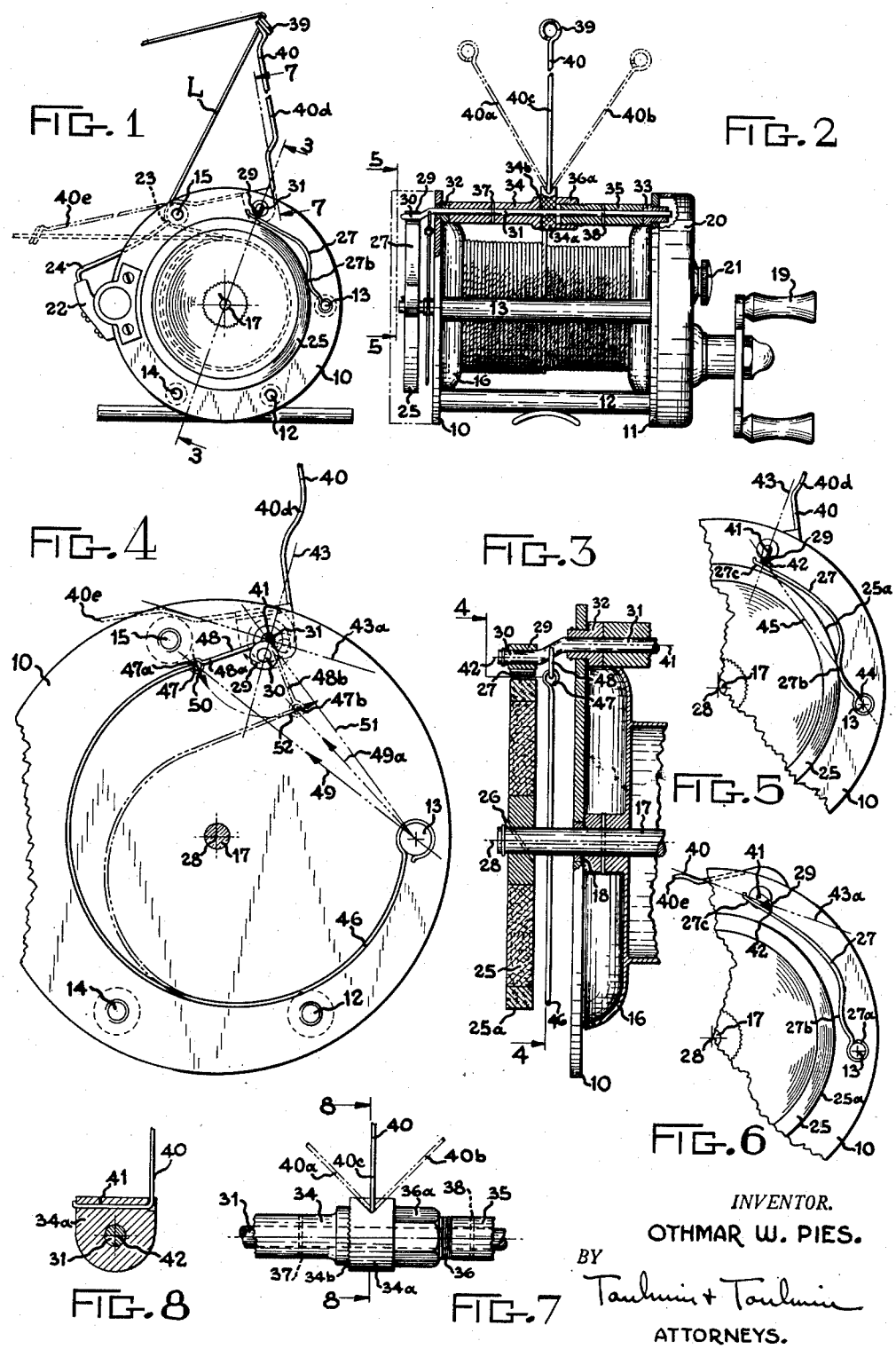
INVENTOR.
OTHMAR W. PIES.
BY Toulmin + Toulmin
ATTORNEYS.

Patented June 5, 1951

2,555,604

UNITED STATES PATENT OFFICE 2,555,604

AUTOMATIC REEL CONTROL MECHANISM

Othmar W. Pies, Cincinnati, Ohio, assignor, by mesne assignments, to Aqua-Sportsman, Inc., Norwood, Ohio, a corporation of Ohio Application January 9, 1946, Serial No. 640,057

5 Claims. (Cl. 242—84.5)

This invention pertains to reels and is more particularly directed to the provision in a fishing reel of improved means for automatically preventing unwinding of the line from the spool of the reel when the line is slackened and relieved of tension.

The invention is more particularly adaptable for reels which are used for casting, being so constructed and arranged as to prevent the so-called back lash when the cast is completed, thus preventing the line from becoming snarled and entangled through undesired free spinning of the spool.

The principal object of the present invention is to provide a fishing reel, particularly adapted for casting purposes, having improved means for checking the rotative movement of the spool whenever the tension in the line is relieved.

A further object of the invention is to provide improved means for preventing undesired free spinning of the spool of the reel, either at the end of a cast or when a hooked fish suddenly takes a reverse direction while the line is being played out.

A further object is to provide an automatic anti-back lash control mechanism for a fishing reel which is highly sensitive and instantaneously responsive to tension variations in the line.

Still another object is to provide an automatic reel control mechanism requiring an operating force inversely proportional to the tension in the line.

It is also an object to provide a fishing reel spool brake, responsive to tension in the line, which is controlled by a decreasing amount of force applied by the line as the brake is operated toward released position.

Another object is to provide a back lash control mechanism for a fishing reel spool which antomatically increases in sensitivity with increase in tension in the line.

A further object is to provide an automatic back lash control mechanism particularly adapted to a fishing reel of the level winding type.

And a further object is to provide a back lash control device for a reel having mechanism which operates with decreasing effort in applying the retarding action to the reel spool and which device is controlled by a compensating mechanism requiring a decreasing amount of effort to release the spool for free rotation so as to provide a back lash device highly sensitive and instantaneously responsive to variations in tension in the line.

Further features and advantages of this invention will appear from a detailed description of the drawings in which:

Figure 1 is a side elevation of a fishing reel incorporating the features of this invention.

Figure 2 is a front elevation of the reel shown in Figure 1.

Figure 3 is an enlarged fragmentary section of the reel on the line 3—3 of Figure 1.

Figure 4 is a fragmentary enlarged end view of the reel indicated by the line 4—4 in Figure 3.

Figure 5 is an enlarged view of the reel indicated by the line 5—5 in Figure 2, showing the brake in engaged position.

Figure 6 is an enlarged view similar to Figure 5, showing the brake in released position.

Figure 7 is a fragmentary enlarged view of the level wind follower control arm, indicated by the line 7—7 in Figure 1.

Figure 8 is a section on the line 8—8 of Figure 7.

For illustrative purposes, this invention is shown applied to a fishing reel, which may be of conventional design, having the end plates 10 and 11 interconnected by suitable spacer rods 12, 13, 14, and 15. The spool 16 is appropriately fixed to a shaft 17 journaled in suitable bearings 18, one of which is shown in Figure 3, in the end plates 10 and 11. The usual manual spool rotating crank handle 19 connected by suitable transmission gearing in the housing 20 on the end plate 11 is provided, including the usual drag ratchet mechanism controlled by the button 21. A conventional level winder 22, appropriately driven from the transmission gearing in the housing 20, is preferably used, the line L passing over the guide eyelet 23 of the arm 24 of the level winder to facilitate the even distribution of the windings of the line on the reel spool 16.

When the fishing reel is being used for casting the spool is adjusted for free rotation, the drag mechanism being rendered inoperative by appropriately adjusting the button 21. Under these conditions it is necessary to effect a substantially instantaneous stopping of the spinning of the spool whenever slack develops in the line, as when the bait strikes the water or the fish suddenly changes course momentarily causing slack in the line, in order to prevent entanglement of the line about the spool. To avoid these difficulties, an automatic reel control mechanism or back lash eliminator is provided comprising a brake drum or disc 25 rigidly secured to the spool shaft 17 by a suitable pin 26. A brake member comprising a flat spring 27 has one end bent into a loop 27a and fixed to the frame of the reel to the outer projecting end of the spacer rod 13 so that the brake member normally springs away to brake released position as shown in Figure 6, when pressure is released from its outer end 27c. The brake member is so formed as to provide a surface or brake shoe 27b adapted to frictionally engage the periphery 25a of the brake disc when its outer end 27c is deflected toward the axis of rotation 28 of the brake disc 25 and spool shaft 17. The brake member is so arranged as to normally release itself from the brake disc 25 when pressure is released from its outer end 27c.

The outer end 27c of the brake member 27 is operatively engaged by a roller 29 journaled on the eccentric crankpin portion 30 of the brake operating crankshaft 31 which is journaled in suitable bearings 32 and 33 carried in the end plates 10 and 11 of the reel frame. Mounted on and fixed to the crankshaft 31 is the control lever member 34 and the spacer member 35 secured to the crankshaft 31 by the pins 37 and 38.

The crankshaft 31 is rocked to cause the roller 29 on the eccentric crankpin 30 to actuate the brake member 27 in response to variations in tension in the line L. The line L, coming from the spool 16 through the eyelet 23 of the level winder, passes through the eyelet 39 of the back lash control lever 40 which is pivotally mounted in a suitable bearing 41, Figure 8, formed in the member 34a journaled on the crankshaft 31. The member 34a is adjustably connectable relative to the member 34 by the serrated or jaw clutch connection 34b, a nut 36a on the threaded portion 36 of the member 35 serving to lock the members 34 and 34a together through this connection. The serrated connection 34b facilitates the proper positioning of the lever 40 relative the crankpin 30 of the crankshaft 31.

Thus, by swinging the control lever 40 transversely of the axis of rocking movement 42 of the crankshaft 31, rocking or swinging movement may be imparted to the crankshaft by this lever. The extent of the rocking or swinging movement to positions 40a and 40b, Figure 2, is such as to automatically accommodate the control lever 40 to any position of the level winder eyelet 23 during the operation of the reel. This arrangement allows the control lever 40 to be formed with a single small eyelet 39 and a single very lightweight arm 40c so as to greatly minimize inertia in the control lever for very rapid and sensitive response of the device to tension in the line L.

When the control lever 40 is in the position 40d of brake engagement to arrest rotation of the spool 16 upon release of tension in the line L, as shown in Figures 1, 4, and 5, the roller 29 on the eccentric crankpin 30 of the crankshaft 31 is positioned as best seen in Figure 5 so that the main axis 41 of the crankshaft and the axis 42 of the crankpin 30 lie in a plane indicated by the line 43, Figures 4 and 5, which is substantially perpendicular to the face of the outer end 27c of the brake spring 27 so as to move this end 27c toward the brake disc 25 to effect engagement of the portion 27b of the brake member 27 with the brake disc 25. It will be noted that in this position of the crankshaft and roller 29, a powerful toggle action effect is produced against the end 27c of the brake spring 27 with relatively little effort being required to rotate the crankshaft 31 and the lever 40 in this position.

The efficiency and ease of operation in applying the brake member 27 is further enhanced by the relative position of the contact point 27b of the spring 27 with the disc 25 as indicated by the lines 44 and 45, Figure 5. Great leverage is provided to effect the braking action since the distance indicated by the line 44—45 between the mounting rod 13 and roller 42 is greater than the distance indicated by the line 44 between the mounting rod 13 and the contact point 27b. Thus, upon the final application of the brake to stop the disc 25 and therefore the spool of the reel, relatively little pressure and effort is required to rotate the operating crankshaft 31.

When the lever is swung from the position 40d indicated in Figures 1, 4, and 5 to the position 40e of brake disengagement for free rotation of the spool with tension in the line L, indicated in Figures 4 and 6, the crankshaft 31 is rocked through substantially 90 degrees of rotation so as to now bring the position of the crankpin axis 42 with respect to the axis 41 of the crankshaft into a plane indicated by the line 43a lying substantially parallel to the end 27c of the brake member or spring 27. Under these conditions, the spring 27 fully releases itself from operating contact at the point 27b with the disc 25.

It can thus be seen that as the control lever is rotated clockwise, comparing Figures 5 and 6, the initial clockwise movement causes the roller to deflect the spring or brake member 27 relative to the mounting rod 13 until the point 27b ultimately contacts the disc 25. When the point 27b does begin to engage the disc 25, the crankshaft has rotated the crankpin and roller 29 substantially toward the position indicated in Figure 5, whereupon the powerful toggle action then takes place to rapidly and positively force the point 27b into engagement with the disc 25 and thereby substantially instantly arrest rotation in the disc. This arrangement also allows rapid release of the brake member 27 from the disc 25 as the control arm 40 is swung in a counterclockwise direction, Figures 1, 4, and 6, as tension develops in the line L.

Means are provided for automatically normally maintaining the control lever 40 in the position 40d shown in Figures 1, 4, and 5 of engagement of the brake with the disc 25 so that when there is no tension in the line L the brake will be automatically held on to prevent rotation of the spool. Apparatus for accomplishing this result may preferably comprise a spring 46 having one end looped about so as to pivot about the projecting end of the spacer rod 13 and having its other end pivotally connected by means of a suitable eyelet 47 to an operating arm 48 fixed to the crankshaft 31 as best seen in Figure 3. The operating arm 48 swings from the position 48a to the position 48b upon swinging of the control lever 40 and rocking of the crankshaft 31 in disengaging the brake for the reel spool. Normally, the spring 46 tends to swing the lever 48 from the position 48b to the position 48a so as to in turn rock the crankshaft 31 to maintain the brake member 27 in engagement with the disc 25.

The spring 46 is attached to the arm 48 of the crankshaft 31 in such a way that the spring exerts a maximum rotative force on the crankshaft 31 when the control arm 40 is moved to brake engaged position 40d as shown in Figures 1, 4, and 5. The spring is arranged to automatically decrease its effectiveness to rotate the crankshaft toward brake engaged position when the control lever is moved toward disengaged position 40e, as indicated in Figures 1, 4, and 6. This is accomplished by the relative position of the eyelet connection 47 and the axis of rotation 41 of the crankshaft 31. Particularly noting Figure 4, when the control lever 40 is in the brake engaged position 40d, the eyelet 47 will be at position 47a and the effectiveness of the force of the spring will take place along the line 49 between the eyelet and the mounting rod 13. Under these conditions, the swinging motion of the eyelet is substantially parallel to the line of spring action 49, as indicated by the arrow 50. Also, the eyelet 47, under these conditions, is relatively far removed from the axis of rotation 41 of the crankshaft 31 with respect to the line 51 passing through the mounting rod 13 and the axis 41 of the crankshaft.

As the lever 40 moves in a counter-clockwise direction by the application of tension in the line L, the eyelet 47 moves ultimately to the position 47b so that the movement of the eyelet now is substantially perpendicular to the line of spring action 49a between the eyelet and the mounting rod 13, as indicated by the arrow 52, so that the effort required to compress the spring by rotation of the crankshaft and swinging of the lever 40 at this time is very greatly reduced. This is due to the fact that the eyelet 47b now lies substantially in the line 51 between the mounting rod 13 for the spring and the axis 41 of the crankshaft.

Thus, during these latter stages of full disengagement of the brake, a toggle action with respect to the spring 46 takes place so as to greatly reduce the effectiveness of the spring to oppose the free rocking motion of the crankshaft 31 at a time when the greatest tension exists in the line L. This arrangement is highly desirable and essential to the efficient and rapid operation of the automatic reel control backlash eliminator in that when the line L is under full tension it is then substantially parallel to the lever 40, as seen at 40e in Figure 1, so that its effective force in a direction transverse to the line is very small even though great tension exists in the line. Therefore, by making the control lever 40 operable with extremely light transverse pressure being applied by the line L under these conditions, a highly sensitive and responsive control for the reel brake is attained.

It will be seen that the control lever 40 is provided with operating characteristics such that upon final application of the brake a minimum of force is required to rotate the crankshaft to force the brake member 27 against the brake disc 25 while at this same time the operating spring 46 for normally applying the brake is at its maximum power application position. This renders the brake easily and effectively operable with a minimum of control effort and with the utilization of a very light spring 46.

It will also be noted that upon release of the brake by swinging the control lever 40 by the tension in the line L, the lever 40 becomes automatically more easily moved in a counter-clockwise direction of brake release as tension increases in the line. Thus, in this automatic reel control mechanism, the control device responsive to tension in the line becomes increasingly more sensitive and easily actuated with increase in tension in the line. The device is therefore also instantly responsive to apply a firm braking pressure for rapidly arresting rotation of the spinning speed spool when slack results in the line.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a fishing reel having a frame and a backlash control mechanism for restricting rotation of the spool of said reel, a single eyelet control lever, operable by the line of said reel for actuating said backlash control mechanism, mounted for universal swinging movement on said frame for automatically accommodating itself to any condition of winding of the line on said spool and to any degree of tension in said line.

2. In a fishing reel control mechanism responsive to tension in the line on the spool of said reel, a brake device for arresting rotation of said spool, a level winder associated with said spool, and a single eyelet control lever for said brake device universally mounted on said reel to accommodate itself to tension in said line to control said brake and to the movements of said level winder in distributing said line on said spool.

3. In a fishing reel having a frame, a spool journaled on said frame, a brake device associated with said spool, and a rock shaft for actuating said brake device, a level winder associated with said spool, and a single control lever for actuating said rock shaft to control said brake, and mounting means for said lever on said rock shaft adapted to swinging movement of said lever in a plane parallel to the axis of rocking movement of said rock shaft while causing said lever when swung in a plane perpendicular to said axis to rock said shaft to actuate said brake.

4. In an automatic control mechanism for a fishing reel comprising a frame, and a spool journaled in said frame, a brake device associated with said spool comprising a brake disc connected for rotation with said spool, a brake member mounted on said frame in operative braking engagement with said brake disc, and an operating mechanism for applying said brake member to said disc comprising a crankshaft journaled in said frame, a crankpin on said crankshaft operably engaging said brake member so that the eccentricity of said crankpin effects movement of said brake member to or from braking engagement with said disc upon rocking of said crankshaft, a line operated control lever, and means for adjustably connecting said lever to rock said crankshaft comprising a serrated clutch member fixed to said crankshaft, a mating serrated lever carrying member journaled on said crankshaft, and a clamping nut threadedly connected to said crankshaft and engaging said lever carrying member to maintain engagement of said serrated members.

5. In an automatic reel control mechanism for a fishing reel comprising a frame and a spool journaled in said frame, a brake disc mounted for rotation with said spool, a brake member mounted on said frame in operative relationship with said disc, including means for normally urging said brake member toward released position, means for actuating said brake to engaged position comprising a crankshaft journaled in said frame, a crankpin on said crankshaft operatively engaging said brake member, a control lever mounted on said crankshaft for swinging movement in the plane of the axis of said crankshaft having an eye for passing the fishing line on said reel and movable in response to tension in said line to turn said crankshaft in a direction to move the crankpin away from the brake member and thereby to permit said member to move to brake released position, and spring means normally urging said crankshaft and lever toward brake engaging position so as to engage said brake means on said disc to arrest rotation of said spool when tension in said line drops, said spring means and crankshaft being so arranged that said spring means acts with a decreasing force when said crankshaft is moved toward brake released position with increasing tension in said line.

OTHMAR W. PIES.

REFERENCES CITED

The following references are of record in the file of this patent:

UNITED STATES PATENTS

| Number | Name | Date |
|---|---|---|
| 41,494 | Dougherty | Feb. 9, 1864 |
| 843,514 | Baumgartel | Feb. 5, 1907 |
| 1,539,646 | Catucci | May 26, 1925 |
| 1,569,210 | Snyder | Jan. 12, 1926 |
| 1,587,557 | Schmid | June 8, 1926 |
| 1,892,541 | Smelser | Dec. 27, 1932 |
| 2,190,984 | Gulbrandsen | Feb. 20, 1940 |
| 2,326,645 | Hill | Aug. 10, 1943 |

FOREIGN PATENTS

| Number | Country | Date |
|---|---|---|
| 345,872 | Great Britain | Apr. 2, 1941 |
| 790,537 | France | Sept. 9, 1935 |